United States Patent [19]

Desor

[11] Patent Number: 5,241,370
[45] Date of Patent: Aug. 31, 1993

[54] METHODS AND APPARATUS FOR REDUCING THE COLOR NOISE OF A TELEVISION SIGNAL USING A LIMITER WITH TRANSFER FUNCTION

[75] Inventor: Hans-Juergen Desor, Gundelfingen, Fed. Rep. of Germany

[73] Assignee: Deutsche ITT Industries GmbH, Freiburg, Fed. Rep. of Germany

[21] Appl. No.: 749,743

[22] Filed: Aug. 26, 1991

[30] Foreign Application Priority Data

Aug. 30, 1990 [EP] European Pat. Off. ........ 90116639.7

[51] Int. Cl.⁵ .............................................. H04N 9/68
[52] U.S. Cl. .......................................... 358/36; 358/40
[58] Field of Search ..................... 358/36, 40, 31, 37

[56] References Cited

U.S. PATENT DOCUMENTS

| | | | |
|---|---|---|---|
| 4,926,361 | 5/1990 | Ohtsubo et al. | 364/574 |
| 5,047,840 | 9/1991 | Miki | 358/36 X |
| 5,047,866 | 9/1991 | Watanabe et al. | 358/36 X |
| 5,060,056 | 10/1991 | Miki et al. | 358/36 X |

FOREIGN PATENT DOCUMENTS

0194759 2/1986 European Pat. Off. .

Primary Examiner—Victor R. Kostak
Attorney, Agent, or Firm—Thomas L. Peterson

[57] ABSTRACT

An arrangement and method for reducing the noise component of a television picture chrominance signal, using a vertical digital filter. A noise-reduced reference signal is formed from the chrominance signals of vertically preceding lines. A difference signal is derived, wherein the noise-reduced reference signal, entering into the calculation of the difference signal, is created by the recursive signal processing operations of the digital filter. The transversal signal-processing operations of the digital filter affects the reduction of the noise component. The difference signal, before passing through the recursive and transversal signal-processing operations, is applied to a limiter. The limiter introduces an amplitude-dependent attenuation to obtain a modified difference signal. The modified difference signal enters into the recursive and transversal signal-processing operations instead of the original difference signal.

21 Claims, 3 Drawing Sheets

METHODS AND APPARATUS FOR REDUCING THE COLOR NOISE OF A TELEVISION SIGNAL USING A LIMITER WITH TRANSFER FUNCTION

FIELD OF THE INVENTION

The present invention relates to an apparatus and methods for reducing the color noise signal components from a television picture chrominance signal, utilizing a vertical digital filter.

BACKGROUND OF THE INVENTION

The chrominance signal for each line of a television picture, comprises a desirable color component and an undesirable noise component. The noise component has a stochastic spectral distribution superimposed across the color component. In the past, "high quality filters", or "H.Q. filters", have been used to eliminate some of the noise components. H.Q. filters work by generating a difference signal, whose frequency and amplitude are derived from the noise component of a line and the correlation between the color component of the line and the color component of vertical preceding lines. A digital filter having recursive and transversal signal-processing operations is used to create a noise-reduced signal by subtracting the difference signal, weighted by a correction factor, from the chrominance signal of a line.

Such H.Q. filters work fairly well if chrominance signals of vertically successive lines are well correlated. The reason being that the frequency and amplitude of the difference signal would be determined essentially by the noise component of the line to be processed. The result being a difference signal with a low frequency and small amplitude, that is inputted to the recursive digital filter without modification.

However, H.Q. filters do not work well if the chrominance signals of vertically successive lines are not suitably correlated. Such a scenario occurs whenever there is a sudden color transition, in a television picture, between two lines that follow each other closely. In such an event, the difference signal created has a high-frequency and a large signal amplitude. If this difference signal is applied to the input of the recursive digital filter, blurring of the color transitions would occur. This effect, known as "color hanging", impairs the color fidelity of the television picture. In "color hanging", the difference signal applied to the recursive signal-processing circuitry results in a reference chrominance signal that is no longer determined primarily by the noise component to be eliminated. The reference chrominance signal is now determined by the color transition, which occurred in the vertically preceding lines, so that an efficient reduction or elimination of the color noise is no longer possible.

The analog circuitry used in the H.Q. filter method is relatively costly and complicated. Furthermore, if a PAL color television signal were to be processed, the phase of the R-Y component of a PAL chrominance signal would be reversed on alternate lines. Consequently, two delay lines are necessary in known H.Q. filters. Such delay lines are extremely expensive and serve to inflate the cost of a typical television receiver.

Another disadvantage of prior art arrangements is that they do not permit the correction of specific color errors in the television picture if used with a video recorder. During the recording of color-television signals, the lines of a field are displaced, relative to each other, on the video tape from track to track. In some playback modes, such as the search mode, the video head transcribes a slanted path across the tracks. As such, half-line displacements and sign errors of the PAL R-Y component may occur in the reproduced video signal. To correct such disturbances in the television picture, a special circuit designed for this purpose was employed. This increases the manufacturing costs of the video recorder, since the recorder must contain a circuit for correcting color noise and another circuit for eliminating the color errors just described.

The present invention discloses a method and apparatus that prevents color hanging from occurring in the presence of vertically uncorrelated chrominance signals. The apparatus, according to this invention, operates so that with only simple additional circuitry, correction of half-line displacements and phase errors of a PAL color-television signal is achieved.

The method and apparatus of the present invention creates a difference signal that is passed through a limiter. The limiter has a transfer function selected so that small difference signals propagate through the limiter unchanged. Large difference signals are suppressed by the limiter and with a transition taking place for intermediate difference signals. A difference signal, representing uncorrelated chrominance signals of vertically successive lines, is thus attenuated as a function of amplitude. A difference signal representing correlated chrominance signals of vertically successive lines is transmitted unattenuated. The modified difference signal thus obtained, is applied to the recursive and transversal signal-processing circuitry instead of the original difference signal.

One advantage of the invention over prior art arrangements is its particularly simple design. The prior art arrangements require at least two multipliers, three subtracters, and six registers.

The preferred arrangement of the present invention enables one to carry out the method according to the invention with only one multiplier, one subtracter, and three registers. This considerably simpler circuitry reduces the manufacturing costs considerably.

Prior art that discloses pertinent noise signal reduction means are exemplified by U.S. Pat. No. 4,926,361 to Ohtsubo, et al and European Patent No. 194,759 to Faroudja.

It is therefore an object of the invention to provide an arrangement and apparatus for reducing color noise signal components from television picture chrominance signals.

It is a particular object to prevent color hanging from occurring on a television screen in the presence of vertically uncorrelated chrominance signals.

SUMMARY OF THE INVENTION

In accordance With the invention, the subtrahend input of a subtracter is connected to a second register and is selectively connected to either of the outputs of a delay device. The delay device provides a delay equal to the period of one line of the television picture. The output of the subtracter is connected to the input of a limiter. The output of the limiter is connected to a first register whose output is coupled to the input of the delay device, the input of a multiplier, and the input of a third register. The output of the multiplier is connected to the input of the second register. The input of the multiplier is selectively connected, via a switch, to either a first memory register or a second memory register in which a first correction factor, a second correction factor, and two values of the correction constant are stored.

In accordance with another aspect of the invention, first and a second inverters are provided which precede and follow a digital filter. Such an arrangement of the two inverters offers a number of advantages. First, it is especially easy to process both NTSC color-television signals and PAL color-television signals with one digital filter. In the case of NTSC signals, the filtering can be carried out without modification of either the R-Y component or the B-Y component of the chrominance signal. In the case of PAL color-television signals, in which the phase of the R-Y component is reversed on alternate lines, the signal component of the baseband is inverted in every second line of the vertically successive lines. This has the advantage that the digital filter, following the first inverter, can be designed independently of the (phase) standard of the color-television signals to be processed. The correction of the R-Y components of the PAL color-televisions signals, in the first inverter, therefore simplifies the circuit of the digital filter. Another advantage is that only a single delay device, e.g., a shift register, is necessary. The prior art required at least two analog delay lines. This greatly reduces the manufacturing costs of the digital filter.

In accordance with another aspect of the invention, the delay device of the digital filter is designed in the form of two equal length partial delay devices. Such a design of the delay device entails only a minimum increase in cost but allows both the method of reducing color noise and that of correcting reproduction errors to be carried out with a single circuit. This eliminates the need for the "color correction" circuit used in the prior art, so that the manufacturing costs of a video recorder are considerably reduced.

BRIEF DESCRIPTION OF THE FIGURES

The above objects, further features and advantages of the invention are described in detail below in conjunction with the drawings, of which.

DETAILED DESCRIPTION OF THE FIGURES

Figure 1:
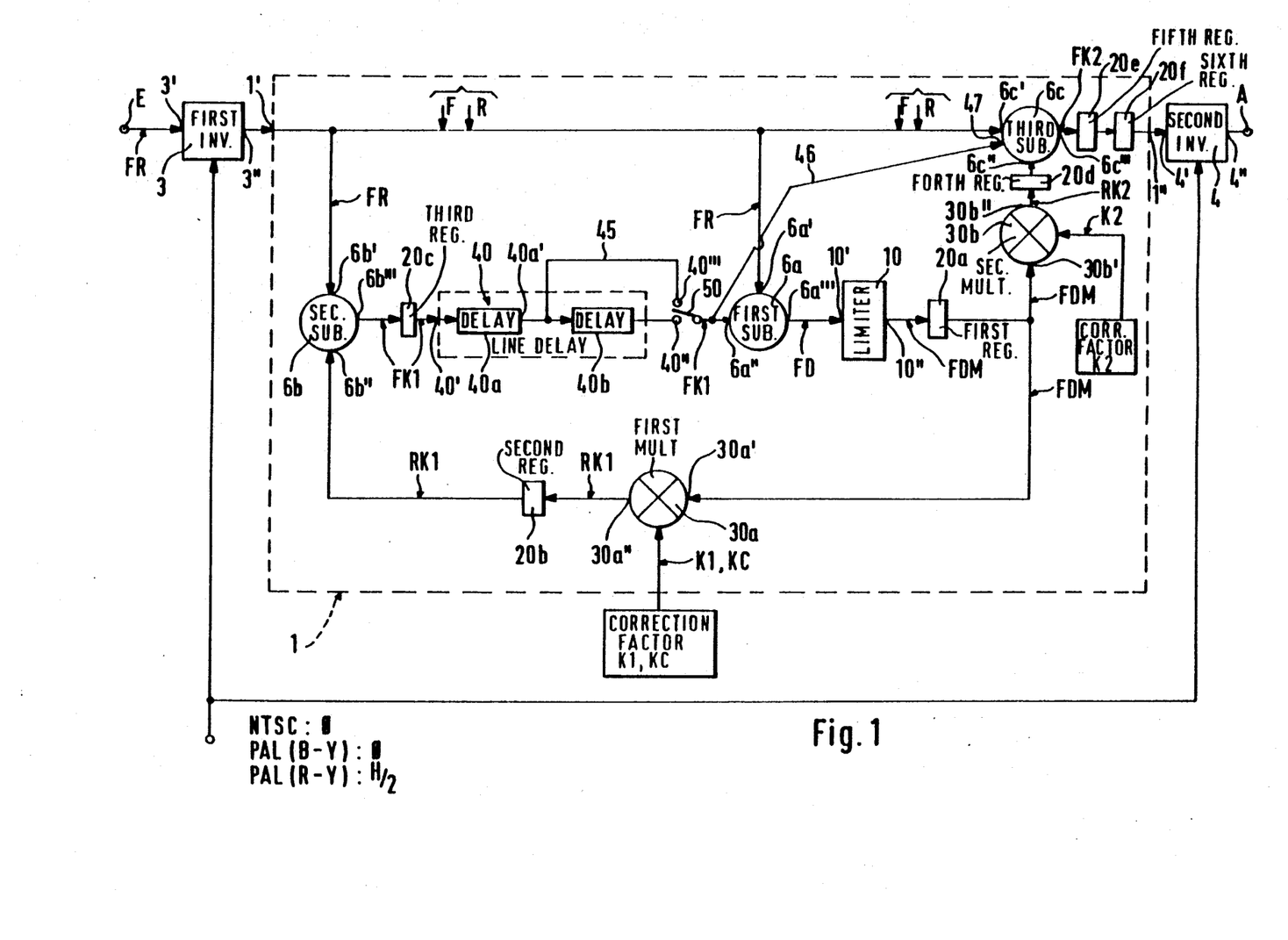
FIG. 1 is a block diagram of the arrangement for reducing color noise component signals.

By referring to FIG. 1, the method of reducing noise signals, and the basic arrangement for carrying out this method, will be described. The block diagram shows a vertical digital filter 1 which is preceded by a first switchable inverter 3 and followed by a second switchable inverter 4. The chrominance signal FR of a line of a television picture is applied to input E. This signal consists essentially of the color component F, which contains the color information, and a noise component R. The noise component R is superimposed over the color component F in a stochastic spectral distribution. The chrominance signal FR at the input E was previously digitized, by an analog-to-digital converter (not shown), and separated from the composite color signal by means of a comb filter (not shown). In a demodulator (not shown), the chrominance signal FR, containing the R-Y component and the B-Y component in quadrature modulation, is demodulated and converted down to the baseband. This is a well known prior art configuration.

A sample frequency of at least eight times the Nyquist frequency is needed for both the digital conversion of the analog color signal and for the digital demodulation of the R-Y and B-Y components of the chrominance signal FR. In practice, this digitization is performed at a sampling frequency which is the same for all television standards and is substantially greater than the bandwidth of the R-Y and B-Y baseband signals (approx. 1 MHz). Through this oversampling, each of the two components of the chrominance signal FR, for a picture line, is split into a sequence of 1296 samples per line. From every eight samples of the chrominance signal R-Y and B-Y components, a digital-signal group is formed. This grouping of the digitized chrominance signal FR, for each picture element of the television picture, makes it possible to process the synchronously occurring R-Y and B-Y components of the baseband in a time-graded manner. The synchronous process uses only one sample of the R-Y component and the B-Y component from each digital-signal group for the vertical noise reduction. Because of the digitization of the signals at eight times the Nyquist frequency, the resulting undersampling of this segment is permitted. Thus, a plurality of sequential, undersampling digital-signal groups is provided. Each of these groups contain, in a time-division multiplex, four samples of both the R-Y component and B-Y component. The rate at which the chrominance is sampled is one-eighth the system clock rate, even though the signal processing takes place at the system clock rate. This permits time sharing of certain functional system modules.

In the following description, for simpler notation, no distinction is made between a sample of a digital-signal group and the chrominance signal of the line, which consists of the samples. This does not affect the generality of the following considerations, since the method described depends only on the vertical correlation of vertically successive lines. The horizontal correlation of successive digital-signal groups or successive samples is relatively insignificant.

It is thus readily apparent that in the following description of the recursive and transversal signal-processing operations, the term "chrominance signal of a line" means the sequential processing of all undersampled digital-signal groups of the line. Consequently, a "vertical correlation of the chrominance signals" means the vertical correlation of corresponding digital-signal groups.

The reduction of the color noise of the chrominance signal FR for each line of the television picture, takes place in eight clock intervals of the system clock. The clock controls the digital-signal processing of the chrominance path for the television receiver as follows:

SEQUENCE OF OPERATION DURING EACH CLOCK INTERVAL

First Clock Interval

During the first clock interval, the chrominance signal FR is applied to an input 3' of the first inverter 3. This first inverter 3 is activated only on the R-Y components of a color-television signal conforming to the PAL (Phase Alternation Line) standard. In that case, the first inverter 3 inverts the phase of the R-Y component on every other line of the vertically successive lines for a television picture.

By doing so, the digital filter 1, following the first inverter 3, can now be designed independently of the television signal standard employed. The correction of the line-alternating R-Y components of the PAL color-television signals, by the first inverter 3, simplifies the circuitry considerably. A particular advantage is that for PAL television signals, the apparatus described herein requires only a single delay device into which the R-Y and B-Y components are alternately applied at the system clock rate.

The nonalternating B-Y component, of a PAL color-television signal, is passed by the first inverter 3 without phase inversion. The same applies to the nonalternating R-Y and B-Y components of an NTSC color-television signal.

The R-Y component of the chrominance signal FR is applied from the output 3″ of the first inverter 3, to a minuend input 6a′ of a first subtracter 6a. The subtrahend input 6a″, of the first subtracter 6a, is supplied with a noise-reduced reference chrominance signal FK1. The noise-reduced reference chrominance signal FK1, as will be described in detail later, is derived by recursive signal-processing of the chrominance signals of one or more vertically preceding lines.

In the first subtracter 6a, the R-Y component of the difference signal FD is formed from the R-Y component of the chrominance signal FR and the reference chrominance signal FK1. Prior to the calculation, the reference chrominance signal FK1 was averaged over several vertically preceding lines in order to reduce the amount of noise. The difference signal FD represents the change in line content between vertically successive lines. If the color component F, of the chrominance signal FR, and the color components of the lines vertically preceding this line are well correlated, the difference signal FD is determined essentially by the noise component R of the line. This noise component R is to be eliminated.

If the chrominance signals of vertically successive lines are not suitably correlated (uncorrelated), such as when color transitions occur between these lines, the difference signal FD will contain high-frequency components with a large signal amplitude. Such a difference signal FD must not be applied to the recursive filter because a blurring of color transitions will occur. This effect, as described and known as "color hanging", results in a degradation in the color fidelity of the television picture.

To avoid color hanging, it is especially important that the first subtracter 6a be followed by a limiter 10. The limiter 10 receives the difference signal FD. In the presence of well correlated signals of vertically successive lines, a difference signal FD is produced with a low-frequency and small-amplitude. The limiter 10 passes such a difference signal FD unchanged. If the input 10′ of the limiter 10, is supplied with a difference signal FD, representing uncorrelated chrominance signals, the signal will be attenuated or completely suppressed.

Figure 2:
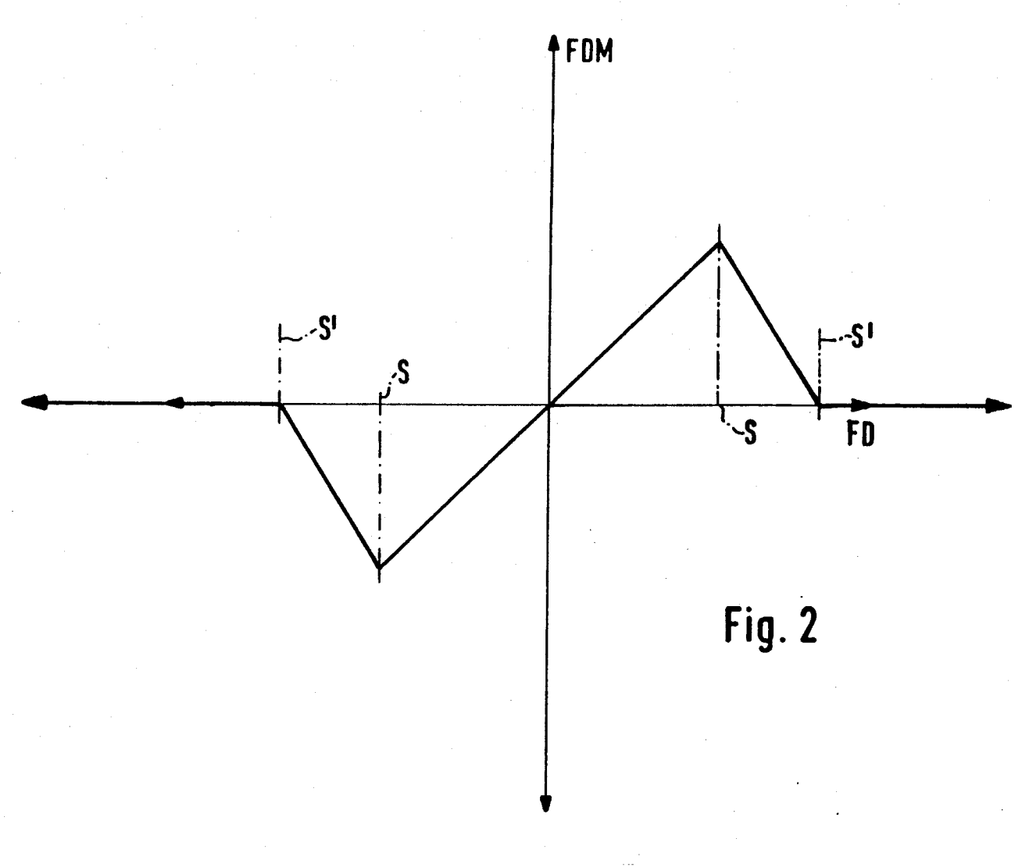
FIG. 2 is a graph showing the characteristics of the limiter.

FIG. 2 shows the transfer function of the limiter 10. The abscissa of the transfer diagram represents the amplitude of the difference signal FD as presented to the input 10′ of the limiter 10. The ordinate represents the amplitude of a modified difference signal FDM appearing at the output 10″ (FDM) of the limiter 10. At small absolute values of the difference signal FD, the limiter 10 has a proportional transfer characteristic. The amplitude of the modified difference signal FDM, appearing at the output 10″ of the limiter 10, is equal to the amplitude of the difference signal FD.

When the absolute value of the amplitude of the difference signal, FD, exceeds a threshold value S, the difference signal FD applied to the input 10′ will be attenuated. The amplitude of the modified difference signal FDM at the output 10″ decreases steadily (e.g., linearly) while approaching the value "0". A "0" value is reached at the upper threshold value S′.

At small amplitudes of the difference signal FD, the limiter 10 passes the difference signal FD essentially unchanged. At a large-amplitude difference signal FD, the difference signal is attenuated, and completely suppressed above an upper threshold value S′.

The amplitude response of the limiter 10 of FIG. 2 is only exemplary. It should be obvious to one skilled in the art, on how the transfer function of the limiter 10 is selected to obtain the optimum response for the particular application.

Second Clock Interval

During the second clock interval, recursive signal processing is implemented.

The modified difference signal FDM is read from the first register 20a and is directed to the input 30a′ of a first multiplier 30a. The modified difference signal FDM is multiplied by a first correction factor K1 in multiplier 30a. The choice of the first correction factor K1 will be explained following the description of the fourth clock pulse period. The resulting first correction signal RK1 is stored in a second register 20b connected to the output 30a″ of the first multiplier 30a.

Simultaneously with the signal processing just described, the above-described signal processing performed during the first clock pulse period takes place again in the second clock interval. The R-Y component of the chrominance signal for the line to be processed and the noise-reduced reference chrominance signal FK1 are subtracted. This serves to reload the first register 20a with a modified difference signal FDM. The renewed derivation of the difference signal can be eliminated if the first register 20a is designed so that its contents can be read several times, (i.e., as a register which retains its contents beyond the interrogation performed at the beginning of the second clock interval).

Third Clock Interval

Recursive signal processing also takes place during the third clock interval.

The first correction signal RK1 is read from the second register 20b and passed to a subtrahend input 6b″ of a second subtracter 6b. The minuend input 6b′ of the second subtracter 6b receives the R-Y component of the chrominance signal FR.

In the second subtracter 6b, the first correction signal RK1 is subtracted from the R-Y component of the chrominance signal FR, to form the reference chrominance signal FK1. The reference chrominance signal FK1, thus has its noise reduced by the first correction factor K1. This reference chrominance signal FK1 is stored in a third register 20c connected to an output 6b‴ of the second subtracter 6b.

On a color transition in the vertical direction, when a large difference signal FD is present that does not pass through the limiter 10, the noise-reduced reference chrominance signal FK1 assumes the value of the new chrominance signal FR immediately after the second subtracter 6b. Blurring of vertical color transitions is thus avoided in a simple manner.

Transversal signal processing also occurs during the third clock interval.

Simultaneously with the recursive signal-processing operations, the modified difference signal FDM, from the first register 20a, is applied to an input 30b' of the second multiplier 30b. The second multiplier 30b multiplies the modified difference signal FDM by a second correction factor K2. The second correction factor K2 (as will be explained following the description of the fourth clock pulse period) is set in the described manner. The resulting second correction signal RK2 is stored in a fourth register 20d connected to the output 30b'' of the second multiplier 30b.

Fourth Clock Interval

Recursive signal processing also occurs during the fourth clock interval.

The noise-reduced reference chrominance signal FK1 is read from the third register 20c and coupled to the input 40' of a delay line 40. The delay line 40, consists of two partial delay lines 40a and 40b, and is used so that the noise-reduced chrominance signal FK1 appears at its output 40'' the same instant the R-Y component for the chrominance signal FR of the vertically succeeding line reaches the minuend input 6a' of the subtracter 6a. In the case described here, the delay is thus equal to the duration of one line.

The partition of the delay line 40 into two equally long partial delay lines 40a and 40b, as well as the functions of the signal leads 45 and 46 and the switch 50 are not essential for an understanding of the noise-reducing method. These components are only needed based on the method of "color correction" described below. For noise reduction, this division of the delay line 40 into two parts is also not necessary.

Transversal signal processing also occurs during the fourth clock interval.

Simultaneously with the storing of the noise-reduced reference chrominance signal FK1, the second correction signal RK2 is read from the fourth register 20d and passed to a subtrahend input 6c'' of a third subtracter 6c. A minuend input 6c' of the third subtracter 6c receives the R-Y component of the chrominance signal FR. By the subtraction of these two signals, noise component R of the R-Y component is substantially reduced in accordance with the second correction signal RK2. The noise-reduced R-Y component of the resulting noise-reduced chrominance signal FK2 is stored in a fifth register 20e, connected to the output 6c''' of the third subtracter 6c.

The effect of the first and second correction factors K1 and K2 in reducing the color noise of a chrominance signal is apparent to those skilled in the art. The correction factor K1, applied to the first multiplier 30a, determines the time constant of the recursive branch of the digital filter 1. Consequently, correction factor K1 also determines the number of lines used to form the noise-reduced reference chrominance signal FK1.

The second correction factor K2, applied to the second multiplier 30b, determines the reduction of the color-noise component, in the transversal branch of the digital filter 1, and the noise reduction in the output signal proper.

Fifth Clock Interval

Transversal signal processing occurs during the fifth clock interval.

In the fifth clock interval of the signal processing, the noise-reduced R-Y component is transferred from the fifth register 20e to a sixth register 20f.

At the same time, the B-Y component, present at the input E, is processed as was the R-Y component as above described. The signal processing of the B-Y component in the fifth clock interval is identical to the signal processing of the R-Y component in the first clock interval.

Sixth to Eighth Clock Intervals

Transversal signal processing occurs during the sixth, seventh and eighth clock intervals.

In the sixth clock interval the noise-reduced R-Y component of the chrominance signal FK2 is read from the fifth register 20e and transferred to the second inverter 4. The second inverter cancels the modification of the phase of every other R-Y component of the PAL color-television signal as provided by the first inverter 3. Thus, the noise-reduced R-Y component of the noise-reduced chrominance signal FK2 will appear at output A in a form conforming to the respective color-television standard. The operation of the second inverter 4 should be apparent from the description of the operation of the first inverter 3. At the end of the sixth clock interval the noise-reduced R-Y component of the noise-reduced chrominance signal FK2 appears at the output A of the arrangement.

Recursive and transversal signal processing of the B-Y component.

In clock intervals six to eight, the B-Y component present at the input E is processed analogously to the R-Y component in clock intervals two to four.

Apart from the reduction of color noise, a method of correcting half-line color displacements and systematic PAL phase errors, which occur in some operating modes of a video recorder, can be implemented.

As above indicated, in most modes during the recording of video signals, the lines of a field are displaced relative to each other from track to track on the tape. In some playback modes, the video head transcribes a slant path across the tracks of the video tape. Consequently, half-line displacements and/or sign errors of the R-Y component occur in the reproduced video signal for certain lines of the television picture. These must be corrected in the playback mode in order to prevent displacements and distortions in the reproduction of the television picture.

The special advantage of the described apparatus resides in that with minimum additional circuitry, namely the two partial delay devices 40a and 40b, the signal leads 45, 46 and the switch 50, one can provide "noise reduction" and "color correction" using the same circuit.

The method of correcting half-line color displacements and PAL phase errors is performed by means of the described apparatus as follows:

First Clock Interval

The R-Y component of the chrominance signal FR, applied at the input E of the apparatus, is passed through the first inverter 3, the first subtracter 6a, the limiter 10, and the first register 20a, where it is then stored. The first inverter 3, the first subtracter 6a and the limiter 10 are deactivated, so that the R-Y component is passed unchanged.

Second Clock Interval

In the second clock interval, the R-Y component of the chrominance signal FR is read from the first register 20a and transferred to the first multiplier 30a. The multiplier 30a multiplies the R-Y component by a constant KC. The constant KC can only assume the values "+1" or "−1". The first multiplier 30a is supplied with the value of the correction constant KC when the R-Y component of the chrominance signal FR has its standard phase. Accordingly, the value "−1" of the correction constant KC is used whenever the chrominance signal contains a sign error with respect to the standard sequence. In this manner, correction of any sign errors of the R-Y component for the color-television signal is achieved. The R-Y component so processed is stored in the second register 20b.

Third Clock Interval

The R-Y component of the chrominance signal FR is read from the second register 20b and coupled to the subtrahend input 6b" of the second subtracter 6b. The latter is deactivated, so that the R-Y component is passed unchanged to the second register 20c and stored therein.

Fourth Clock Interval

In this clock interval, any half-line displacement of the R-Y component of the chrominance signal FR is corrected. This is accomplished with the two partial delay devices 40a and 40b, signal leads 45 and 46, and switch 50. By placing the switch 50 in the upper position, the signal applied at the input 40', of the delay device 40, is caused to pass through the partial delay device 40a and travel to the output 40'''. This position of switch 50 is used in all cases where the chrominance signal FR, for a line of the television picture, exhibits a half-line displacement in relation to the standard sequence. Consequently, the delay is only half the line period. The R-Y component is subsequently transferred over the additional lead 46 to an additional input 47 of the third subtracter 6c, then stored in the fifth register 20e.

Fifth Clock Interval

The R-Y component of the chrominance signal FR is transferred from the fifth register 20e to the sixth register 20f. At the same time, the B-Y component of the chrominance signal FR is processed as was the R-Y component in the first clock interval.

Sixth to Eighth Clock Intervals

In the sixth clock interval, the R-Y component of the chrominance signal FR is read from the fifth register 20e, transferred to the output 1" of the digital filter 1, and passed through the deactivated second inverter 4 to the output A of the apparatus.

In the above clock intervals, the signal processing of the B-Y component, applied at the input E, is performed analogously to the signal processing of the R-Y component in clock intervals two to four.

It should be noted that in the above description of this embodiment and in the following description of the preferred embodiment, only those devices and components, which are thought necessary for a thorough understanding of the invention were explained. In addition to these devices and components, the arrangements described include conventional components, such as control unit for controlling the switching operations described. Also present are subcircuits which ensure that the individual signals of the recursive and transversal signal-processing operations propagate the signal path described, and that these signals are not affected by interfering signals. Those skilled in the art will comprehend the measures to be taken to implement these requirements in either hardware or software. Also, the replacement of entire functional units by corresponding software programs is within the discretion and ability of one skilled in the art.

Figure 3:
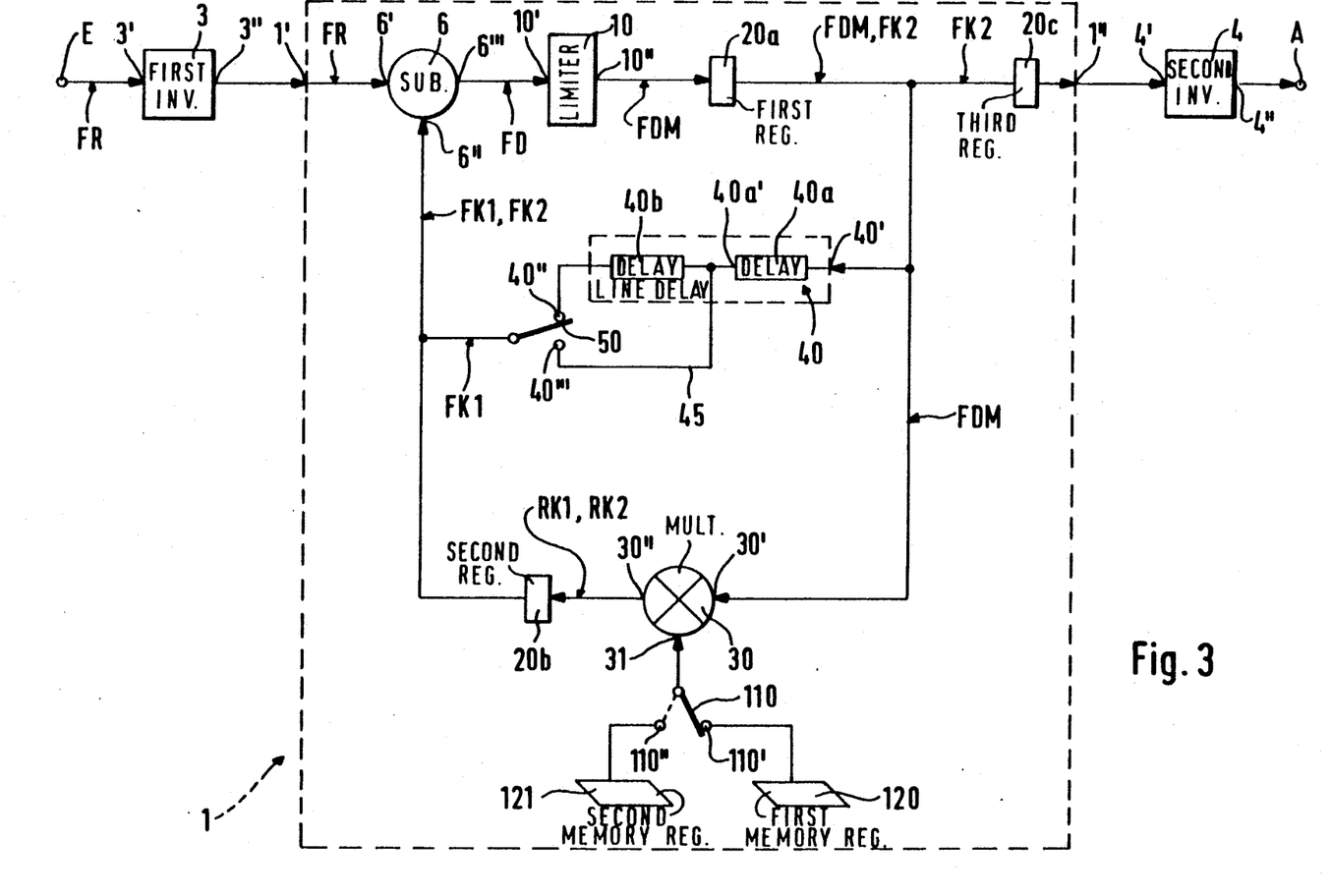
FIG. 3 is a schematic diagram of an alternate embodiment of the arrangement for reducing color noise component signals.

FIG. 3 shows a preferred embodiment of the arrangement for carrying out the two methods described above with fewer components. The basic arrangement illustrated in FIG. 1 incorporates two multipliers 30a and 30b, three subtracters 6a, 6b and 6c, and six registers 20a-20f. The preferred embodiment of the apparatus enables the methods of reducing color noise and correcting color displacements to be implemented using one multiplier 30, one subtracter 20, and three registers 20a, 20b and 20c.

In the "color-noise reduction" mode, the signal processing of the preferred embodiment is as follows. It will be assumed for the sake of brevity and simplicity that some components of the arrangement (subtracter, multiplier, inverter) are inactive and transfer the signal applied at their input to the output unchanged, whenever the concrete function of these components is not explicitly stated. This activation and deactivation is controlled by the control unit (not shown).

First Clock Interval

The R-Y component is transferred from the input E to the first inverter 3. The latter is active or inactive, depending on the phase of the R-Y component. At the same time, the subtrahend input 6" of the subtracter 6 has applied thereto the noise-reduced R-Y component of the reference chrominance signal FK1. After the subtraction of these two signals in the subtracter 6, the resulting R-Y component of the difference signal FD is passed to the input 10' of the limiter 10. The latter has been activated, so that the above-described amplitude-dependent attenuation is produced. The resulting modified difference signal FDM is stored in the first register 20a.

Second Clock Interval

Recursive signal processing occurs during the second clock interval.

The modified difference signal FDM is read from the first register 20a and applied to the input 30' of the multiplier 30. An input 31 of the multiplier 30 is connected, via a switch 110 in its switch position 110', to a first memory register 120, in which the first correction factor K1 is stored. The multiplication of the modified color-difference signal FDM by the first correction factor K1 yields the first correction signal RK1. The first correction signal RK1 is passed to the second register 20b and stored therein. As was described above, the modified difference signal FDM is simultaneously computed again and stored in the first register 20a.

Third Clock Interval

Recursive signal processing occurs during the third clock interval.

The first correction signal RK1, read from the second register 20b, is applied to the subtrahend input 6" of the subtracter 6. At this instant, the R-Y component of the chrominance signal R is presented to the minuend input 6' of the subtracter 6. The subtraction of these two signals yields the noise-reduced reference chrominance signal FK1, which is passed through the limiter 10. The limiter 10 is deactivated during this clock interval, and passes the signal to the first register 20a to be stored therein.

Transversal signal processing also occurs.

The modified difference signal FDM, formed anew in the second clock interval, as read from the register 20a, is passed to the multiplier 30. At this instant, the multiplier input 31 is connected via the switch 110, which is in its second switch position 110" (dashed line), to the second register 20b, in which the second correction signal RK2 is stored.

Fourth Clock Interval

Recursive signal processing occurs during the fourth clock interval.

The noise-reduced reference chrominance signal FK1 is read from the first register 20a and coupled to the input 40' of the delay device 40. The signal passes through the two partial delay devices 40a and 40b and reaches the output 40" of the delay device 40 after a delay equal to the duration of one line of the television picture.

Transversal signal processing also occurs during the fourth clock interval.

At the same time, the modified difference signal FDM is read from the second register 20b and coupled to the subtrahend input 6" of the subtracter 6. The minuend input 6' receives the R-Y component. By the subtraction of these two signals, the noise-reduced R-Y component of the chrominance signal FK2 is provided. The noise reduced R-Y signal propagates through the deactivated limiter 10 to the first register 20a and is stored therein.

Fifth Clock Interval

In this clock interval, the first signal portion of the B-Y component, of the chrominance signal FR, is coupled to the input E. The signal passes through the deactivated first inverter 3 to the minuend input 6' of the subtracter 6 and is processed as was the R-Y component during the first clock interval.

Transversal signal processing occurs during the fifth clock interval.

The R-Y component of the noise-reduced chrominance signal FK2 of the line is read from the first register 20a, transferred to a third register 20c, and is stored therein.

Sixth Clock Interval

The recursive and transversal signal processing of the B-Y component in this clock interval is analogous to the processing of the R-Y component in the above-described second clock interval.

Transversal signal processing of the R-Y component also occurs.

The R-Y component, of the noise-reduced chrominance signal FK2, is read from the third register 20c and transferred to the second inverter 4. Any inversion of the phase of the R-Y component, of the (PAL) chrominance signal FR in the first inverter 3 (see clock interval 1) is corrected. The chrominance signal is transferred to the output A.

Seventh and Eighth Clock Intervals

In these clock intervals, the B-Y component of the first line chrominance signal is processed as was the R-Y component in the third and fourth clock intervals as described above.

The signal processing performed in the preferred embodiment in the mode "color correction" is as follows:

First Clock Interval

The R-Y component of the chrominance signal applied at the input E of the arrangement is passed through the deactivated first inverter 3, the subtracter 6, the limiter 10, and the first register 20a, where it is then stored.

Second Clock Interval

The R-Y component is read from the first register 20a and coupled to the input 30, of the multiplier 30. In the first and second memory registers 120 and 121, which are connected to the multiplier input 31, the values "+1" and "−1" of the correction constant KC are stored. The R-Y component is multiplied by the appropriate value of the correction constant KC to correct any phase inversion. After being multiplied by the correction constant KC, the R-Y component is stored in the second register 20b.

Third Clock Interval

The R-Y component is read from the second register 20b. The read R-Y component is transferred through the subtracter 6 and the limiter 10 and then stored in the first register 20a.

Fourth Clock Interval

The R-Y component read from the first register 20a is coupled to the input 40' of the two-part delay device 40. In this clock interval, any half-line displacement, of the chrominance signal for the line of the television signal, read from the video tape is corrected. In the presence of such a half-line displacement, the switch 50 is controlled by a control unit (not shown) and transfers the signal from the chrominance signal passes only through the delay device 40a to the output 40'''. The signal at the output 40''' is passed through the subtracter 6 and the limiter 10, being stored in the first register 20a.

Fifth Clock Interval

The R-Y component of the chrominance signal, read from the first register 20a, is transferred to the third register 20c and is stored therein.

At the same time, the B-Y component, of the chrominance signal of the line, is processed in a similar manner as the R-Y component in the first clock interval.

Sixth Clock Interval

The R-Y component read from the third register 20c is transferred through the deactivated limiter 4 to the output A of the apparatus.

The B-Y component is processed in a fashion analogous to that in the second clock interval as above described.

Seventh and Eighth Clock Intervals

The B-Y component is processed in a fashion analogous to that described above during clock intervals three and four.

I claim:

1. A method of reducing the color noise of the chrominance signals of a television picture displayed by a television receiver, which receiver includes a vertical digital filter and means responsive to the chrominance signal of each line, where said chrominance signal has superimposed thereon a noise component having a stochastic spectral distribution to provide a difference signal whose frequency and amplitude are determined by the noise component of said line and by the correlation of the color component of said line with the color components of the vertically preceding lines, wherein the provision of said difference signal of the vertically succeeding line, is undesirably effected by recursive signal-processing operations of the digital filter, and means to provide a noise-reduced reference chrominance signal formed from the difference signal (FD) weighted with a first correction factor and from the chrominance signal of said line, and wherein the reduction of the noise component of the chrominance signal of said line is undesirably effected by transversal signal-processing operations, means for providing a noise-reduced chrominance signal formed by subtracting the difference signal weighted with a second correction factor from the chrominance signal of said line, said method including the steps of:

applying the difference signal before application of the signal to the recursive and transversal signal-processing operations to a limiter having a transfer function such that in the presence of a difference signal representing uncorrelated chrominance signals of vertically successive lines, an amplitude-dependent attenuation of the same is introduced, wherein a difference signal representing correlated chrominance signals of vertically successive lines is transmitted unattenuated, and that the resulting modified difference signal enters into the recursive and transversal signal-processing operations in place of the original difference signal.

2. The method according to claim 1, including the step of:

digitizing the chrominance signal of each line of the television picture at a sampling frequency at least equal to eight times the Nyquist frequency of the color components, splitting said digitized signal into the R-Y and B-Y components, where the resulting digitized chrominance signal of each line consists of one or more sequential digital-signal groups each containing, serially in time-division multiplex, four samples of the R-Y component and, subsequent thereto, four samples of the B-Y component of the chrominance signal (FR), and that one sample of the R-Y component and one sample of the B-Y component of each digital-signal group are alternately inputted to said digital filter.

3. The method of claim 2, including the step of:

reversing the phase of the R-Y component of the chrominance signal of a PAL signal on every other line prior to performing vertical filtering cancelling the R-Y component of the noise-reduced chrominance signal with said phase reversal at the output of the digital filter.

4. The method according to claim 3, further including the step of:

propagating the noise-reduced reference chrominance signal through a delay device of the digital filter subtracting from the noise-reduced reference chrominance signal the corresponding R-Y or B-Y component of the chrominance signal of the vertically succeeding line.

5. A method of claim 4, wherein said PAL chrominance signal of a line of a television picture which exhibits a PAL phase error, either has a half-line displacement multiplied by a correction constant in a multiplier or has a half-line displacement delayed by one-half line period in a partial delay device.

6. An apparatus for reducing the noise component from the chrominance signal of each line of a television picture, utilizing a vertical digital filter with recursive and transversal signal-processing operations, said arrangement comprising:

a first subtracter having its minuend input connected to the input of said digital filter;

a delay device coupled to the subtrahend input of said first subtracter, said delay device providing a delay equal to the duration of one line of the television picture;

a first multiplier having its input coupled to the output of said first subtracter;

a second subtracter having its subtrahend input coupled to the output of said first multiplier, and having a minuend input coupled to the input of said digital filter, said second subtracter having an output coupled to said delay device;

a second multiplier having an input coupled to the output of said first subtracter;

a third subtracter having its subtrahend input coupled to the output of said second multiplier and having its minuend input coupled to the input of said digital filter; and a limiter, coupled to the output of said first subtracter that converts a difference signal, presented at its input, to a modified difference signal at its output, in accordance with a predetermined transfer function.

7. The apparatus according to claim 6, wherein said delay device consists of two equally long partial delay devices, the output of said delay device being coupled to the output of the first partial delay device, said delay device outputs being alternatively coupled to an input of said third subtracter, by a switch.

8. The apparatus according to claim 6, wherein said limiter passes small difference signals unchanged, while large difference signals are suppressed and difference signal of an intermediate range are limited by upper threshold values.

9. The apparatus according to claim 8, wherein said limiter has a transfer function that is substantially sawtooth shaped, when said limiter is receiving difference signals of an intermediate range, limited by upper threshold values, such that the output signal of said limiter, up to a first threshold value, rises linearly and descends linearly to a zero value after exceeding said first threshold value.

10. Apparatus for reducing the noise component from the chrominance signal of each line of a television picture utilizing a vertical digital filter with recursive and transversal signal-processing operations, comprising:

a subtracter having its minuend input coupled to said digital filter;

a second register being coupled to the subtrahend input of said subtracter;

a delay device having at least two outputs, being selectively coupled to the subtrahend input of said subtracter delay device, providing a delay equal to the period of one line of the television picture;

a limiter having an input, coupled to the output of said subtracter, and coupled to the input of said delay device;

a first register being coupled to the output of said limiter;

a multiplier having an input coupled to the input of said limiter and having an output coupled to the input of said second register;

a third register having an input coupled to the input of said limiter; and a first and second memory register in either which a first correction factor, a second correction factor and two values of a correction constant are storable, said first and second memory registers being selectively connectable to the input of said multiplier via a switch.

11. The apparatus according to claim 10, wherein said delay device is comprised of two partial delay devices, each providing a delay equal to the duration of one-half a line of a television picture, the output of each partial delay device being selectively coupled to a signal lead by a switch.

12. The apparatus according to claim 11, wherein said limiter passes small difference signals unchanged, while large difference signals are suppressed, and difference signals of an intermediate range are limited by upper threshold values.

13. The apparatus according to claim 12, wherein said limiter has a transfer function that is substantially sawtooth shaped, when said limiter is receiving difference signals of an intermediate range, limited by upper threshold values, such that the output signal of said limiter, up to a first threshold value, rises linearly and descends linearly to a zero value after exceeding said first threshold value.

14. Apparatus for reducing the noise component of the chrominance signal of a line of a television picture displayed on a television screen of a receiver, which television receiver utilizes a vertical digital filter with recursive and transversal signal-processing operations, comprising:

means for deriving a difference signal having a given frequency and amplitude from the noise component of a television line, and the correlation of the color component of said line with the color components of vertically preceding lines; and means for passing said difference signal through a limiter whose transfer function is such that, in the presence of a difference signal, derived from uncorrelated color components of vertically successive lines, an amplitude dependent attenuation of the difference signal is transmitted to the digital filter, and in the presence of a difference signal, derived from correlated color components of vertically successive lines, the difference signal is transmitted unattenuated to the digital filter.

15. The apparatus according to claim 14, further including means for digitizing the chrominance signal of each line at a sampling frequency of at least eight times the Nyquist frequency of the color component.

16. The apparatus according to claim 15, including means for splitting the digitized chrominance signal into its R-Y and B-Y components, wherein the resulting digitized chrominance signal for each line consists of at least one sequential digital signal group, each said signal group containing, serially in time-division multiplex, four samples of both the R-Y and B-Y components, and means for applying at least one sample of each of said components to said digital filter.

17. The apparatus according to claim 16, wherein said chrominance signals are PAL color-television signals, wherein the phase of the R-Y component is reversed on every other line, and the phase of the R-Y component being corrected at the output of the digital filter.

18. The apparatus according to claim 17, further including means for weighting said difference signal by a first correction factor, and means responsive to said chrominance signal and said weighted difference signal, to derive a noise-reduced reference signal, a delay device having an input for receiving said noise reduced reference signal and a minimal input adapted to receive a color component signal, and having an output, a subtracter having the subtrahend input connected to the output of said delay device with the length of the delay being set so that said noise-reduced reference signal appears at said subtrahend input of said subtracter at the instant the R-Y or B-Y component of the chrominance signal appears at the minuend input of the subtracter.

19. A method of reducing the color noise of the chrominance signals of a television picture displayed by a television receiver, which receiver includes a vertical digital filter and means responsive to the chrominance signal of each line, where said chrominance signal has superimposed thereon a noise component having a stochastic spectral distribution to provide a difference signal whose frequency and amplitude are determined by the noise component of said line and by the correlation of the color component of said line with the color components of the vertically preceding lines, wherein the provision of said difference signal of the vertically succeeding line, is undesirably effected by recursive signal-processing operations of the digital filter, and means to provide a noise-reduced reference chrominance signal formed from the difference signal (FD) weighted with a first correction factor and from the chrominance signal of said line, and wherein the reduction of the noise component of the chrominance signal of said line is undesirably effected by transversal signal-processing operations, means for providing a noise-reduced chrominance signal formed by subtracting the difference signal weighted with a second correction factor from the chrominance signal of said line, said method including the steps of:

applying the difference signal before application of the signal to the recursive and transversal signal-processing operations to a limiter having a transfer function such that in the presence of a difference signal representing uncorrelated chrominance signals of vertically successive lines, an amplitude-dependent attenuation of the same is introduced, wherein a difference signal representing correlated chrominance signals of vertically successive lines is transmitted unattenuated, and that the resulting modified difference signal enters into the recursive and transversal signal-processing operations in place of the original difference signal;

digitizing the chrominance signal of each line of the television picture at a sampling frequency greater than the Nyquist frequency of the color components, splitting said digitized signal into the R-Y and B-Y components, where the resulting digitized chrominance signal of each line consists of one or more sequential digital-signal groups each containing, serially in time-division multiplex, at least one sample of the R-Y component and, subsequent thereto, at least one sample of the B-Y component of the chrominance signal (FR), and that one sample of the R-Y component and one sample of the B-Y component of each digital-signal group are alternately inputted to said digital filter.

20. Apparatus for reducing the noise component of the chrominance signal of a line of a television picture displayed on a television screen of a receiver, which television receiver utilizes a vertical digital filter with recursive and transversal signal-processing operation, comprising:

means for deriving a difference signal having a given frequency and amplitude from the nose component of a television line, and the correlation of the color component of said line with the color components of vertically preceding lines;

means for passing said difference signal through a limiter whose transfer function is such that, in the presence of a difference signal, derived from uncorrelated color components of vertically successive lines, an amplitude dependent attenuation of the difference signal is transmitted to the digital filter, and in the presence of a difference signal, derived from correlated color components of vertically successive lines, the difference signal is transmitted unattenuated to the digital filter;

means for digitizing the chrominance signal of each line at a sampling frequency greater than the Nyquist frequency of the color component.

21. The apparatus according to claim 20, including means for splitting the digitized chrominance signal into its R-Y and B-Y components, wherein the resulting digitized chrominance signal for each line consists of at least one sequential digital signal group, each said signal group containing, serially in time-division multiplex, at least one sample of both the R-Y and B-Y components, and means for applying at least one sample of each of said components to said digital filter.

* * * * *